United States Patent [19]

Rothlisberger

[11] 4,133,497
[45] Jan. 9, 1979

[54] TAPE CASSETTE DRIVE INCLUDING MEANS FOR REDUCING TAPE TRANSPORT START-UP SHOCK

[75] Inventor: Kurt Rothlisberger, Morton Grove, Ill.

[73] Assignee: Teletype Corporation, Skokie, Ill.

[21] Appl. No.: 857,335

[22] Filed: Dec. 5, 1977

[51] Int. Cl.² .......................... G03B 1/04; F16D 3/14
[52] U.S. Cl. .................................... 242/200; 242/201; 242/207; 64/27 R
[58] Field of Search .............................. 242/68.1–68.3, 242/46.2–46.8, 197–207, 55; 64/27 R, 27 C, 27 CT, 27 S, DIG. 2

[56] References Cited
U.S. PATENT DOCUMENTS

| | | | |
|---|---|---|---|
| 2,336,307 | 12/1943 | Slye | 64/27 CT |
| 2,437,309 | 3/1948 | Veatch | 242/68.3 X |
| 3,532,293 | 10/1970 | Rose | 242/200 |

Primary Examiner—Leonard D. Christian
Attorney, Agent, or Firm—W. K. Serp; J. C. Albrecht

[57] ABSTRACT

A supply spindle for a cassette recorder which includes means for reducing the abrupt start-up forces to which the recording tape within the cassette is subjected by incrementally coupling the inertial mass of the supply spindle to the tape upon start-up. The supply spindle includes a shaft carrying a supply head for engaging a cassette spool. The supply head is axially as well as rotationally movable upon the shaft. A coil spring, fixed to the shaft and supply head, urges the head to the end of the shaft. Additionally, the spring rotatably biases the supply head against a stop carried on the shaft. Initially upon start-up, only a portion of the mass of the supply spindle is coupled to the magnetic tape with the full mass being subsequently coupled thereto.

7 Claims, 5 Drawing Figures

TAPE CASSETTE DRIVE INCLUDING MEANS FOR REDUCING TAPE TRANSPORT START-UP SHOCK

BACKGROUND OF THE INVENTION

This invention relates to a tape cassette drive system which includes means for reducing the abrupt start-up shock to the tape upon the initial application of the tape transport force.

A storage medium finding increased use for the storage of digital information is a tape cassette. Digital cassettes are similar in construction to audio cassettes although with higher mechanical and electrical standards being maintained due to the relatively high data density recorded upon the tape. Prior to operation, a cassette is placed into the recorder with the drive and supply spindles engaging the drive and supply spools of the cassette. To facilitate alignment and engagement of the supply and drive heads of the tape drive system with the cassette spools, the heads are often spring loaded and pinned to their respective shafts for axial movement. Each of the heads define several radially projecting flutes with each flute defining a cam surface urging the heads into alignment with the tape spools.

A further consideration in providing such a drive system is the effect of abrupt acceleration on the tape during playback and record. Upon start-up, a portion of the relatively large inertial mass of the supply spindle as well as that of the cassette spool and tape carried thereon must be accelerated. The supply spool and supply spindle have considerable mass which is accelerated by the drive force coupled through the recording tape within the cassette. The forces created during start-up, stretch the tape. As the mass of the supply spindle and spool coupled to the tape is accelerated, a tape contraction follows due to overshoot of the supply reel followed by deceleration with an abrupt acceleration and corresponding tape stretch following. The net result is a slowly damped oscillation in the physical length of the tape. Such variations in the length of the tape introduce playback and recording signal errors unless a relatively long time period is accommodated to allow the oscillations in the physical length of the tape to become sufficiently reduced in amplitude. The apparatus to be described is directed to the reduction of such oscillations during start-up of a tape transport by incrementally coupling the inertial mass of the supply system to the tape.

SUMMARY OF THE INVENTION

The invention concerns a cassette drive system including means for reducing the initial shock and corresponding elongation of the magnetic tape during start-up. A shaft carries a head positioned thereon with the head being shaped to engage the spool of a tape cassette. The head is axially slidable along the shaft and biased into a predetermined axial position on the shaft. Additionally, means are included for limiting rotational movement of the head with respect to the shaft. More particularly, a coil spring is positioned about the shaft with on end of the spring fixed to the shaft and with the remaining end fixed to the head. The coil spring is tensioned to exert both an axial and rotational bias upon the head. The axial bias facilitates initial engagement of a reel of the tape cassette with the head by permitting movement of the head along the axis of with respect to the shaft. The rotational bias of the spring forces the head against a first stop. Upon start-up, a portion of the initial start-up shock is absorbed by the spring before the head and drive shaft become firmly engaged coupling the entire inertial mass of the system to the tape. The spindle is particularly effective when used as the supply spindle of a tape cassette drive mechanism.

Other features, objects and advantages of the invention will be more readily appreciated after reference to the following description and accompanying drawings wherein:

DETAILED DESCRIPTION

Figure 1:
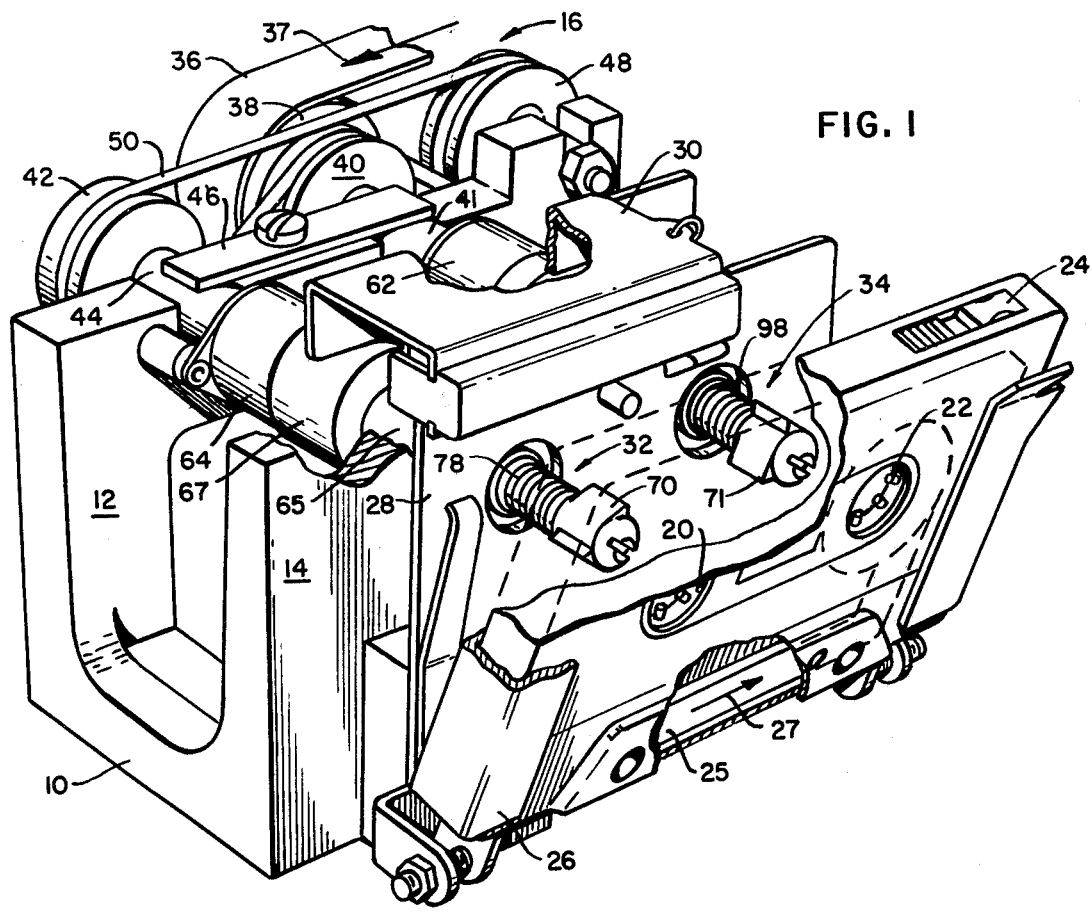
FIG. 1 is a perspective view of a tape cassette record-playback apparatus including a supply spindle embodying certain features of this invention.

The various components of the apparatus of FIG. 1 are mounted upon an elongated, U-shaped support frame 10. One end of the frame 10 defines an upwardly projecting drive assembly support leg 12 with the remaining end defining a cradle assembly support leg 14. Mounted upon the drive assembly support leg 12 is a drive mechanism 16 which serves to drive the supply spool 20 and take-up spool 22 of a tape cassette 24 positioned within a cradle 26. A tape 25 within the cassette moves in the direction of the arrow 27 during the record and playback modes of operation from the supply spool 20 to the take-up spool 22. Mounted upon the support leg 14 is a support plate 28 and pivotally mounted thereto is the cradle 26. When the cradel 26 is swung from the open or loading position as illustrated in FIG. 1 to a closed operating position, a cassette locking mechanism 30 holds and retains the cassette 24 in engagement with a supply spindle 32 and a drive spindle 34.

The drive mechanism 16 is energized by a motor (not shown) coupled through a belt 36, moving in the direction of the arrow 37, and trained about an input drum 38. Mounted to the input drum 38 on a common shaft and supported for rotational movement with respect to the drive mechanism support leg 12 is a grooved drive pulley 40. The common drive shaft is journalled through a drive bushing 41 which is supported by the upper end of the drive assembly support leg 12. Similarly, a second drive pulley 42 is mounted on a shaft journalled through a bushing 44 mounted on the upper end of the drive assembly support leg 12. Both drive bushings 41 and 44 are retained in position by means of a retaining brace 46. The drive mechanism 16 additionally includes an idler pulley 48 coupled to the pulleys 40 and 42 by means of a continuous drive belt 50. It should be noted that the particular pulley and belt configuration described results in opposite rotational movement of the pulley 40 with respect to the pulley 42. For a more detailed description of a drive mechanism similar to that illustrated, the reader's attention is directed to U.S. Pat. No. 3,909,845 entitled "Apparatus and Method for Sensing the Condition of A Tape Within A Tape Cassette" issued to Rothlisberger et al. on Sept.

30, 1975, and having a common assignee with this application.

The pulley 40 is coupled to an electromagnetic clutch 62, and the pulley 44 is coupled to a second electromagnetic clutch 64. The electromagnetic clutches 62 and 64 are controlled by suitable circuitry (not shown) and are alternately energized to select the record-playback and rewind operational modes of the cassette drive system. During record-playback clutch 62 is energized with the spindle 32 serving as the supply spindle, and during rewind the clutch 64 is energized. The supply spindle 32 is journalled through a bushing 65 upon which an electromagnetic brake 67 is mounted. The combination is mounted to the upper edge of the cradle assembly support leg 14. It has been found that a slight energization of the brake 67 during the playback-record operations provides a desirable drag on the supply spindle 32 and spool 20 thus maintaining a relatively uniform feed of the tape 25 through the cassette 24. The rearward end (as viewed in FIG. 1) of the supply spindle 32 is secured to a portion of the clutch 64 and the remaining end is terminated by an axially and radially yieldable supply head 70, shaped for engagement with the internal teeth of the cassette supply spool 20. Similarly, the drive spindle 34 is journalled through a sleeve secured to the upper end of the cradle assembly support leg 14. One end of the dirve spindle 34 is similarly secured to the clutch 62 with remaining end carrying a drive head 71 adapted to engage the internal teeth of the take-up spool 22 of the cassette 24. The construction of the supply spindle 32 is illustrated in detail in FIGS. 2, 3, 4, and 5.

Figure 2:
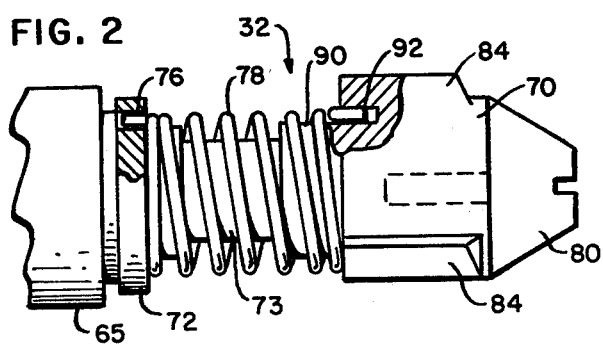
FIG. 2 is a partially sectionalized view of a portion of the supply spindle of the apparatus of FIG. 1.

With reference to FIG. 2, the supply spindle 32 includes a supply shaft 73 which passes through the brake 67. Forming part of the spindle 32 and secured to the shaft 73 for rotation therewith is a spring retaining collar 74 having an outwardly projecting flange defining a recess 76 receiving and holding one end of a coiled compression spring 78. The end of the shaft 73 is drilled and tapped for receipt of a supply head retaining screw 80 which serves to prevent the supply head 70 from being pushed off the shaft 73 by the axial bias of the coil spring 78. As illustrated, the head 70 includes three radially projecting equally spaced flutes 84 which are shaped and positioned to engage the internal teeth of the cassette spool 20. The supply head 70 also defines a rearwardly projecting shoulder 90 which is journalled over the shaft 73 with the compression spring 78 positioned thereabout. The surface of the head 70 disposed toward the spring 78 defines a hole 92 for receipt of the remaining end of the compression spring 78.

Figure 3:
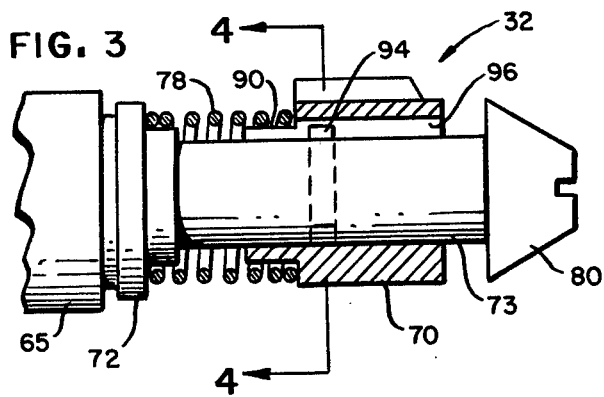
FIG. 3 is a full sectional view of a component of the supply spindle of FIG. 2.

The axial bias provided by the spring 78 urges the supply head 70 against the surface of the retaining cap screw 80 which has been machined to display a smooth low friction surface. It will be appreciated that the spring 78 is tensioned to produce two force vectors upon the head 70. An axial bias urges the head 70 toward the cap screw 80 and a rotational bias urges the head 70 about the shaft 73 to the position illustrated in FIG. 4. With reference to FIG. 3, the head 70 is shown axially shifted along the shaft 73 compressing the spring 78. This condition may be temporarily attained during the initial movement of the cassette 24 into engagement with the head 70. Frequently upon initial engagement, the internal teeth of the reel 20 are not in complete alignment with the flutes 84 of the head 70 and thus a limited amount of relative movement between the head 70 and reel 20 is accommodated during such axial movement of the head. If this axial movement were not provided to facilitate the camming alignment of the supply head 70 with its respective spool 20, the force of the head 70 entering the cassette spool 20 could easily damage the cassette.

Figure 4:
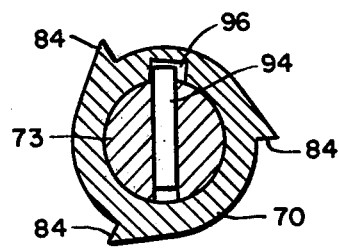
FIG. 4 is a full sectional end view of the supply spindle of FIG. 3 taken along the lines 4—4 thereof.
Figure 5:
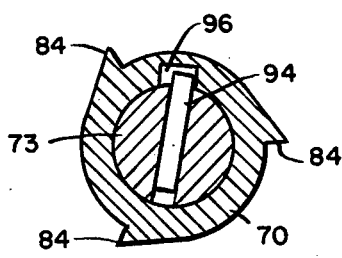
FIG. 5 is a full sectional end view of the supply spindle of FIG. 4 illustrating an alternate position thereof.

A main feature of the illustrated supply head 70 is its ability to absorb the initial starting shock to the tape within the cassette thus greatly reducing the oscillations in the tape dimensions upon start-up. An elongated member in the form of a pin 94 is imbedded in the drive shaft 73 and protrudes slightly from the surface of the shaft into a key-way 96 formed in the inner surface of the drive head 70. The key-way 96 is dimensioned slightly greater than that necessary to accommodate the pin 94 and thus allows a limited twist of the drive head 70 about the shaft 73. Prior to energization of the clutch 62, the drive shaft 73 and head 70 are in the relative positions illustrated in FIG. 4 with the torque provided by the coil spring 78 being in a counterclockwise direction urging the pin 94 against the wall of the key-way 96 thus limiting rotary movement of the drive head 70. Upon energization of the clutch 62 the tape is transported in the record direction indicated by the arrow 27, rotating the spool 20 in a counterclockwise direction. The head 70 as viewed in FIG. 4 is also rotated in a counterclockwise direction against the bias of the spring 78 since it is directly coupled to the spool 20. The remainder of the spindle 32 exhibits a certain inertial mass which coupled with the force of the brake 65, results in the initial impact of the starting torque being mainly absorbed by the spring 78. As the spring twists, the drive head 70 moves counterclockwise until the pin 94 contacts the opposite wall of the notch 96 as shown in FIG. 5 whereupon the full mass of the supply spindle 32 is coupled to the cassette tape. In this manner, the mass of the supply system is coupled to the cassette tape in a progressive manner. The construction of the drive spindle 34 is conventional, neither of the ends of a coil spring 98 being secured to either the drive head 71 or the drive spindle 34 shaft. Thus, only axial bias is exerted on the drive head 71.

An apparatus has been described which facilitates the driving of the magnetic tape between the supply and drive spools of a tape cassette. Although the invention has been shown and described with reference to a single embodiment thereof it will be appreciated that various changes in form and detail may be made without departing from the scope and spirit thereof.

What is claimed is:

1. In an apparatus for driving the spools of a tape cassette including a shaft carrying a head positioned thereon and adapted to engage one of the cassette spools the head being slidable along the shaft and biased into a predetermined axial position on the shaft, the improvement comprising:

means for limiting rotational movement of the head coaxially with respect to the shaft between a first position and a second position arcuately spaced from said first position, said first and second positions defining an arcuate segment of the shaft; and means for biasing said head to said first position so that the initial movement of said head with respect to said shaft upon start-up is against the force of said biasing means thus allowing initial relative movement of said head with respect to said shaft against the bias of said biasing means until said head reaches said second position whereupon said head and said drive shaft coaxially rotate in unison.

2. The apparatus of claim 1 wherein said biasing means is a coil spring with a first end fixed to said shaft and with the remaining end fixed to said head, said coil spring being tensioned to exert both an axial and rotational bias upon said head with respect to said shaft.

3. The apparatus of claim 2 wherein said means for limiting coaxial rotational movement of said head with respect to said shaft includes a member projecting from the outer surface of said drive shaft into a recess defined by said head so that a first portion of said recess determines said first position and a second portion of said recess determines said second portion whereby the degree of coaxial rotational movement of said head with respect to said shaft is determined by the size of said recess in comparison with the size of said member.

4. The apparatus of claim 2 wherein said head defines an axially projecting sleeve surrounding said shaft with one end of said coil spring seated against said sleeve.

5. The apparatus of claim 4 wherein said means for limiting rotational movement of said head coaxially about said shaft includes a member projecting from the outer surface of said shaft into a recess defined by said head so that a first portion of said recesses determines said first position and a second portion of said recess determines said second position the degree of rotational movement of said head about said shaft is determined by the relative size of said recess with respect to said member.

6. An apparatus for absorbing the abrupt shock to which the tape within a tape cassette is subjected upon start-up and thus reducing the corresponding dimensional variation in the tape comprising:

a supply spindle having an inertial mass and including a supply shaft carrying a supply head adapted to engage the supply spool of a cassette and being slidable along the shaft and means for biasing said supply head into a predetermined axial position on the shaft, means for limiting rotational movement of the head coaxially with respect to the shaft between a first position and a second position arcuately spaced from said first position thereby defining an arcuate segment of the shaft; and means for biasing the head to said first position so that a limited amount of the inertial mass of the supply spindle is coupled to the tape upon initial start-up with the full mass of the spindle being coupled to the tape when said second position is reached with the head and shaft rotating in unison.

7. The apparatus of claim 6 wherein said biasing means is a coil spring with a first end fixed to said shaft and with the remaining end fixed to said head, said coil spring being tensioned to exert both an axial and rotational bias to said head with respect to said shaft.

* * * * *